United States Patent [19]
Tran

[11] Patent Number: 5,839,697
[45] Date of Patent: Nov. 24, 1998

[54] METHOD AND APPARATUS FOR TURN COORDINATION GAIN AS A FUNCTION OF FLAP POSITION

[75] Inventor: Chuong B. Tran, Lynnwood, Wash.

[73] Assignee: The Boeing Company, Seattle, Wash.

[21] Appl. No.: 645,616

[22] Filed: May 14, 1996

[51] Int. Cl.⁶ ................................................. G05D 1/08
[52] U.S. Cl. ........................ 244/195; 244/76 R; 244/194
[58] Field of Search .................................. 244/195, 76 R, 244/76 A, 76 B, 194, 177, 178, 179, 203, 230

[56] References Cited

U.S. PATENT DOCUMENTS

| | | |
|---|---|---|
| 2,238,300 | 4/1941 | Zand et al. . |
| 2,450,907 | 10/1948 | Newton et al. . |
| 2,585,162 | 2/1952 | Noxon . |
| 2,883,127 | 4/1959 | Gorzelany et al. . |
| 3,550,884 | 12/1970 | Moeller ..................................... 244/179 |
| 3,618,879 | 11/1971 | Murphy . |
| 3,777,242 | 12/1973 | Tribuno et al. . |
| 4,479,620 | 10/1984 | Rogers et al. . |
| 4,676,460 | 6/1987 | Hagy et al. . |
| 4,964,599 | 10/1990 | Farineau ..................................... 244/177 |
| 5,050,086 | 9/1991 | Lambregts . |
| 5,072,893 | 12/1991 | Chakravarty et al. . |
| 5,089,968 | 2/1992 | Orgun et al. . |
| 5,127,608 | 7/1992 | Farineau et al. . |
| 5,452,865 | 9/1995 | Tran et al. . |
| 5,493,293 | 2/1996 | Hansen et al. ........................... 244/181 |

FOREIGN PATENT DOCUMENTS

| | | |
|---|---|---|
| 148742 | 9/1948 | Australia . |
| 201775 | 12/1954 | Australia . |
| 599225 | 6/1960 | Canada . |
| 599273 | 6/1960 | Canada . |
| 679586 | 9/1952 | United Kingdom . |
| 790272 | 2/1958 | United Kingdom . |
| 1112379 | 5/1968 | United Kingdom . |

*Primary Examiner*—William Grant
*Assistant Examiner*—Tien Dinh
*Attorney, Agent, or Firm*—Christensen, O'Connor Johnson & Kindness PLLC

[57] ABSTRACT

An improved method and apparatus for determining the amount of turn coordination gain in an aircraft yaw damper during a turn maneuver is disclosed. The yaw damper includes inputs from the inertial reference units of the aircraft and also from the flight management computer of the aircraft. The flight management computer provides to the yaw damper a signal indicative of the position of the flaps of the aircraft. The yaw damper includes a turn coordination gain box that receives the flap position signal and outputs a turn coordination gain value, dependent upon the flap position. Generally, the turn coordination gain value increases as the flap position is more extended. The precise turn coordination gain value for each flap position is dependent upon the particular aerodynamic characteristics of the aircraft.

7 Claims, 6 Drawing Sheets

| FLAP POSITION | GAIN |
|---|---|
| 0 | $G_1$ |
| 1 | $G_2$ |
| 5 | $G_3$ |
| 10 | $G_4$ |
| 15 | $G_5$ |
| 20 | $G_6$ |
| 25 | $G_7$ |
| 30 | $G_8$ |

METHOD AND APPARATUS FOR TURN COORDINATION GAIN AS A FUNCTION OF FLAP POSITION

FIELD OF THE INVENTION

The present invention pertains to aircraft turn control systems, and more particularly, to a novel system that varies the turn coordination gain of the aircraft yaw damper as a function of aircraft flap position.

BACKGROUND OF THE INVENTION

In maneuvering an aircraft of fixed-wing configuration, a turn is coordinated through the operation of multiple control elements. For example, a pilot will use the cockpit controls on a fixed-wing aircraft to manipulate the ailerons, rudder and elevator of the aircraft to execute the turn.

The employment of computer controlled rudder deflection for turn coordination during aircraft banking maneuvers has long been practiced. The coordination of the turn is known to be desirable since, for example, when an aircraft is banked left, the aircraft tends to yaw to the right, due to an aileron-induced moment about the yaw axis. The yaw axis moment induced during a left bank is counteracted by the application of left rudder for a coordinated turn. In modern large commercial passenger aircraft, the deflection of the rudder is computer controlled by means of a system known as the yaw damper. Thus, a pilot need only manipulate the wheel in order to properly execute a turn.

The yaw damper includes various sensors on the aircraft and yaw damper servos that operate the rudder in response to signals from the yaw damper. Yaw dampers must determine the amount of rudder deflection for a given amount of bank angle as commanded by the pilot of the aircraft. For example, U.S. Pat. No. 5,452,865 to Tran and U.S. Pat. No. 5,072,893 to Chakravarty et al., contain detailed discussions of prior art turn coordination systems.

One crucial portion of the yaw damper is what is known as the gain schedule. The gain schedule operates to provide turn coordination for the rudder during a turn maneuver. Known turn coordination gain schedules are based upon the parameter $Q_c$, also known as impact pressure. Specifically, the gain schedule for a Boeing 747-400 is shown in FIG. 1. As seen, the turn coordination gain is constant until a critical air pressure, at which point the turn coordination gain decreases in a linear fashion. It has been found that the gain schedule shown in FIG. 1 does not optimally provide for turn coordination, sometimes resulting in a divergent or convergent turn characteristic.

SUMMARY OF THE INVENTION

The present invention provides an improved method and apparatus for determining the amount of turn coordination gain in an aircraft yaw damper system during a turn maneuver. The yaw damper includes inputs from the inertial reference unit(s) of the aircraft and also from the flap slat electronic unit (FSEU) of the aircraft. The inertial reference units provide information on the aircraft's roll rate, lateral acceleration, roll angle, and yaw rate. The FSEU provides to the yaw damper a signal indicative of the position of the flaps of the aircraft. The yaw damper includes a turn coordination gain box that receives the flap position signal and outputs a turn coordination gain value, dependent upon the flap position. The turn coordination gain value is then used by the yaw damper to determine the amount of rudder displacement. Generally, the turn coordination gain value increases as the flap position is more extended, indicative of a high lift configuration of the wing such as would be used at low speed. The precise turn coordination gain value for each flap position is dependent upon the particular aerodynamic characteristics of the aircraft under varying flight conditions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
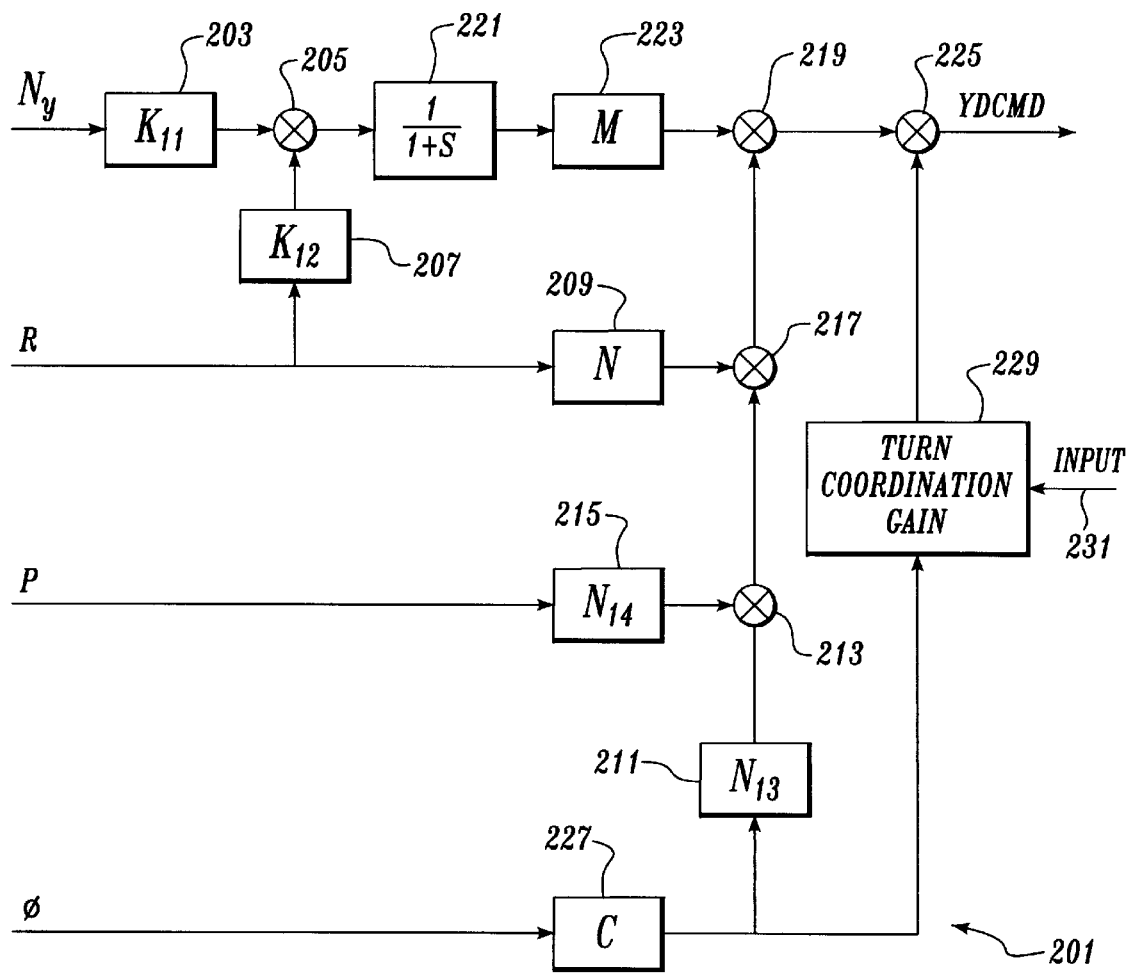
FIG. 2 is a schematic illustration of a prior art yaw damper including a turn coordination gain section.

FIG. 2 shows a simplified prior art yaw damper 201 for generating a yaw damper command, YDCMD, that controls deflection of the rudder during a turn. The YDCMD signal is typically provided to one or more yaw damper servos that actuate the rudder of an aircraft. This particular yaw damper 201 is utilized in the Boeing 747-400 aircraft. The yaw damper 201 uses data input from inertial reference units located on the aircraft to compute rudder commands (YDCMD) appropriate to existing flight conditions. The yaw damper servos then translate the electrical commands from the yaw damper 201 to control hydraulic flow to an actuator piston that moves the rudder of the aircraft.

Input to the yaw damper 201 includes: $N_y$ representing the lateral acceleration of the aircraft; R representing the yaw rate of the aircraft; Φ representing the roll angle of the aircraft; and P representing the roll rate of the aircraft. Each of these parameters are provided through the inertial reference units located on the aircraft.

As can be seen in FIG. 2, the lateral acceleration $N_y$ is multiplied by a constant $K_{11}$ at a first multiplier box 203. The output of first multiplier box 203 is then provided to a first summer 205 which sums the signal output from first multiplier box 203 and the output from a second multiplier box 207. The second multiplier box 207 receives as input the yaw rate R and multiplies the yaw rate R by a predetermined constant, $K_{12}$. The yaw rate R is also provided to a third multiplier box 209 that multiplies the yaw rate R by a predetermined constant $N_{12}$.

The roll angle Φ is provided to a seventh multiplier box 227 which multiplies the roll angle Φ by a constant, C. The output of the seventh multiplier box 227 is provided to a fourth multiplier box 211 that multiplies the output of seventh multiplier box 227 by a constant $N_{13}$. The output of fourth multiplier box 211 is provided to a second summer 213 which adds the output of fourth multiplier box 211 with the output of a fifth multiplier box 215. Fifth multiplier box 215 multiplies the roll rate P by a predetermined constant $N_{14}$. The output of second summer 213 is provided to a third summer 217 which also receives as an input the output of third multiplier box 209. The output of third summer 217 is provided to a fourth summer 219.

The output of first summer 205 is provided to a first order lag box 221. The output of the first order lag box 221 is provided to a sixth multiplier box 223, which multiplies the output of first order lag 221 by a gain factor M. The output of sixth multiplier box 223 is also provided to fourth summer 219. The output of fourth summer 219 is then provided to a fifth summer 225.

Figure 1:
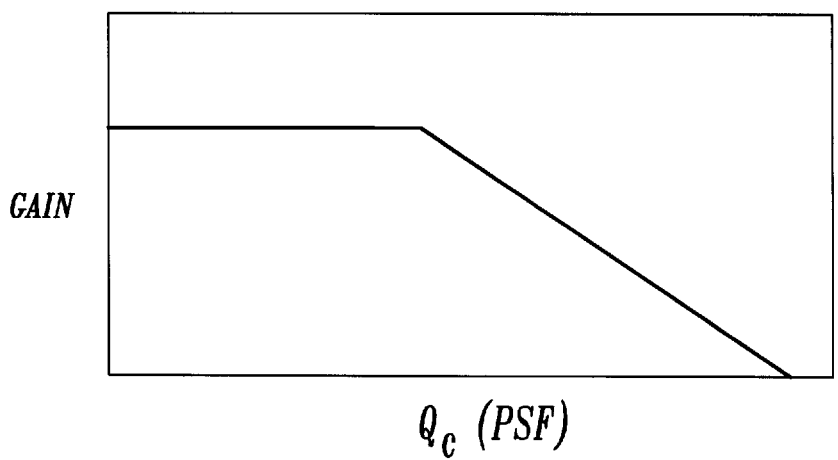
FIG. 1 is an illustration of a prior art turn coordination gain schedule.

The output of seventh multiplier box 227 is also provided to a turn coordination gain box 229. The turn coordination gain box 229 also receives as input a signal 231 from the air data computer of the aircraft a signal, such as airspeed $V_{TAS}$ (in the case of the Boeing 767) or exterior air pressure $Q_c$ (in the case of the Boeing 747). In the prior art, the input from the air data computer is used to calculate a turn coordination gain value that is used to multiply with the output of seventh multiplier 227. The calculation of the turn coordination gain in the Boeing 747 is in accordance with FIG. 1.

In the preferred embodiment of the present invention, the input 231 provided to the turn coordination gain box 229 is a signal from the flap slat electronic unit (FSEU) which indicates the position of the aircraft flaps. Instead of the prior art, where the input 231 is either $V_{TAS}$ or $Q_C$, the input 231 in the preferred embodiment is flap position. The flaps are located on the wings of an aircraft and are extended or retracted to control the amount of lift generated by the wings. The position of a flap is typically referred to in degrees. For many aircraft, the flaps can be placed in one of several discrete degree positions. For example, in the Boeing 777, the flaps may be placed at 1, 5, 10, 15, 20, 25, or 30 degrees extension from the retracted position.

Figures 3, 4:
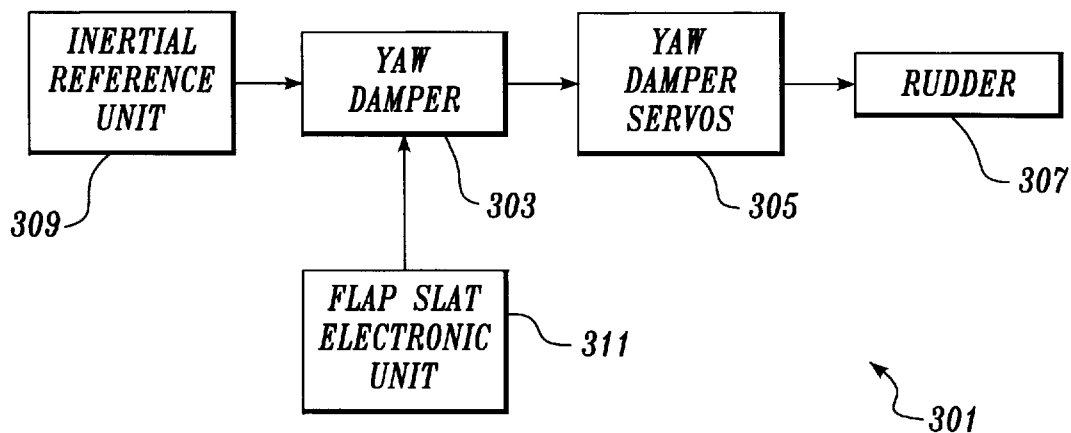
FIG. 3 is a schematic diagram of a yaw damper system in accordance with the present invention.
FIG. 4 is a look-up table used in the turn coordination gain box of the present invention.

Turning to FIG. 3, the yaw damper system 301 of the present invention includes a yaw damper unit 303, a yaw damper servo 305, a rudder 307, an inertial reference unit 309, and a FSEU 311. Aircraft motion information is provided by the inertial reference unit 309 to the yaw damper unit 303. Flap position information is provided to the yaw damper 303 by the FSEU 311. The yaw damper unit 303 receives this information and, in accordance with its calculation techniques, formulates a YDCMD signal to the yaw damper servo 305. In turn, the yaw damper servo actuates the rudder to the desired deflection. Thus, unlike the prior art which relied upon $V_{TAS}$ or $Q_c$ of the aircraft, the present invention relies on the flap position of the aircraft to determine the turn coordination gain.

The turn coordination gain box 229 consists of a multiplier and a look up table implemented in a microprocessor. The input from seventh multiplier 227 is multiplied by the appropriate turn coordination gain value from the look up table. The look up table may be implemented in ROM. Based on the flap position as reported by the FSEU 311, the appropriate turn coordination gain value is used as the multiplier. A tabular representation of the look up table is shown in FIG. 4, with $G_1$ through $G_8$ being the possible values of gain.

FIGS. 5–9 illustrate graphically how the turn coordination gains are calculated and the theoretical basis for the calculations. As is known in the art, optimal turn coordination gain requires a neutrally stable spiral mode after closing the yaw damper loop. Thus, the gain of the yaw damper must drive the spiral mode of the closed loop system to the origin. The gain driving the spiral mode to the origin can be obtained by solving the state equations for the closed loop aircraft system at a steady state turn angle. This process can be derived mathematically as follows:

Let $$\dot{x}_1 = a_1 x_1 + b_1 u_1$$

$$y_1 = c_1 x_1 + d_1 u_1$$

be the dynamical equation of the airplane model $$\text{where } a_1 = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix};$$

$$x_1 = \begin{bmatrix} \beta \\ R \\ \Phi \\ P \end{bmatrix}; \beta = \text{sideslip angle}$$

$$b_1 = \begin{bmatrix} b_{11} \\ b_{12} \\ b_{13} \\ b_{14} \end{bmatrix}; u_1 = [\delta r]; y_1 = \begin{bmatrix} Ny \\ R \\ \Phi \\ P \end{bmatrix}$$

$$c_1 = \begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix}; d_1 = \begin{bmatrix} d_{11} \\ d_{12} \\ d_{13} \\ d_{14} \end{bmatrix}$$

Figure 5:
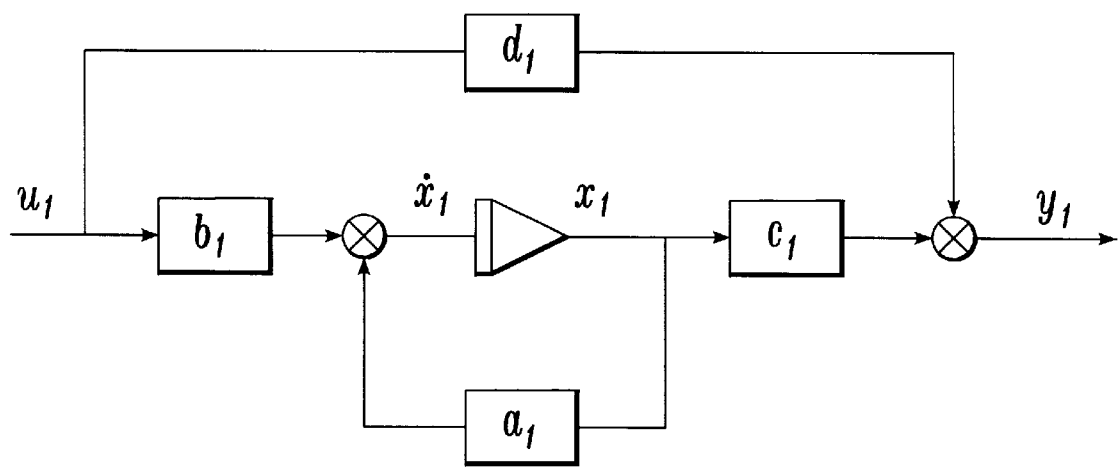
FIGS. 5–9 are graphical representations of the mathematical models used to formulate the gain schedule used in the present invention.

The block diagram representation of the equations above is shown in FIG. 5.

The matrices $a_1$, $b_1$, $c_1$, $d_1$ represent the aerodynamic model for the particular aircraft that is being modeled. The parameter $u_1$ represents the amount of rudder deflection. It can be appreciated by those skilled in the art that these matrices can be calculated in accordance with known techniques based upon the physical dimensions of the aircraft and the flight parameters of the aircraft. Moreover, the matrices $a_1$, $b_1$, $c_1$, $d_1$ will be different for different flap positions of the aircraft. This is because when the flap positions of the aircraft change, the aerodynamic characteristics of the aircraft change, thereby changing the matrices that define the behavior of the aircraft.

Next, let $$\dot{x}_2 = a_2 x_2 + b_2 u_2$$

$$y_2 = c_2 x_2 + d_2 u_2$$

be the dynamical equation of the yaw damper (without the turn coordination path), $$\text{where } a_2 = [j]; b_2 = [k_{11} k_{12} k_{13} k_{14}]; u_2 = \begin{bmatrix} Ny \\ R \\ \Phi \\ P \end{bmatrix}$$

$$y_2 = [\text{ydcmd}]; c_2 = [m]; d_2 = [n_{11} n_{12} n_{13} n_{14}]$$

Figure 6:
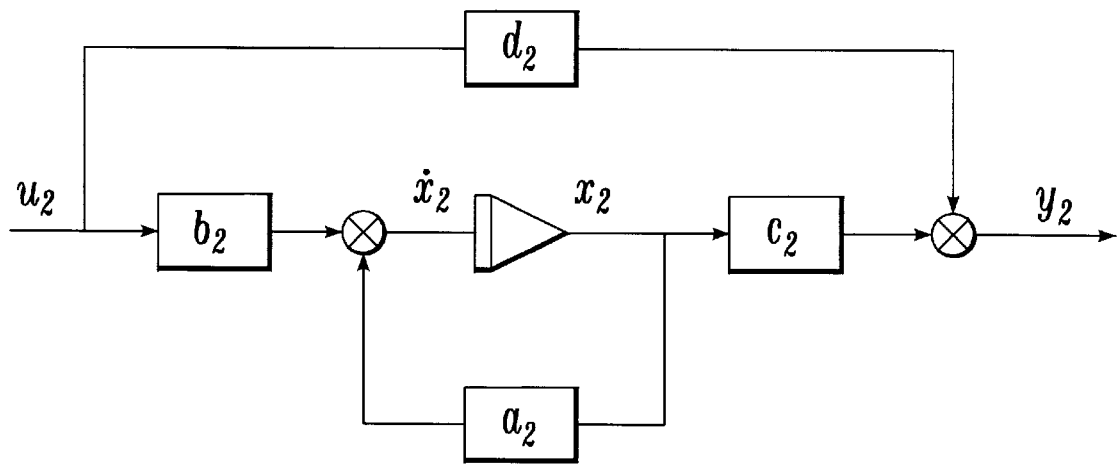

Its block diagram representation is shown in FIG. 6.

Figure 7:
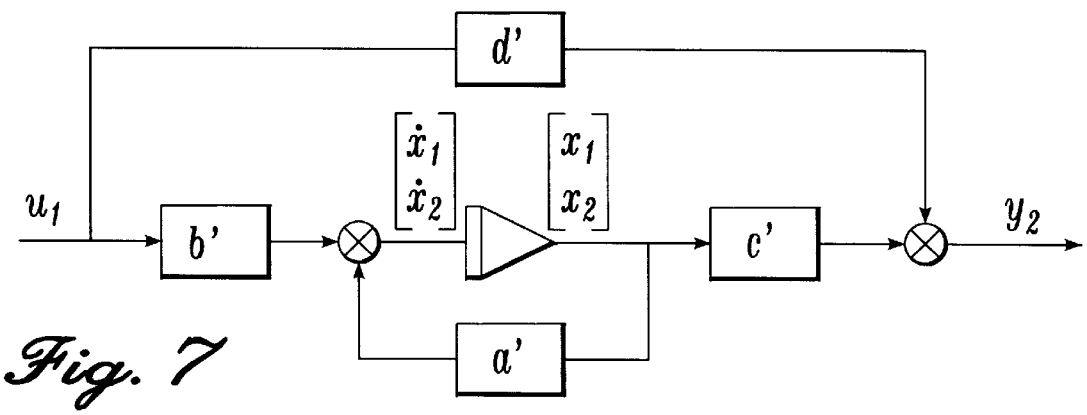

The values of $a_2$, $b_2$, $y_2$, $c_2$, and $d_2$ may be obtained from the yaw damper system of the particular aircraft. Thus, the values of $b_2$, $c_2$, and $d_2$ can be obtained from the multipliers shown in FIG. 2. Connecting the output of the airplane ($y_1$) to the input of the yaw damper ($u_2$) in series, the resulting block diagram representation of the system is shown in FIG. 7, $$\text{where } a' = \begin{bmatrix} a_1 & 0 \\ b_2 c_1 & a_2 \end{bmatrix}; b' = \begin{bmatrix} b_1 \\ b_2 d_1 \end{bmatrix}; \begin{array}{l} c' = [d_2 c_1 c_2] \\ d' = [d_2 d_1] \end{array}$$

Figure 8:
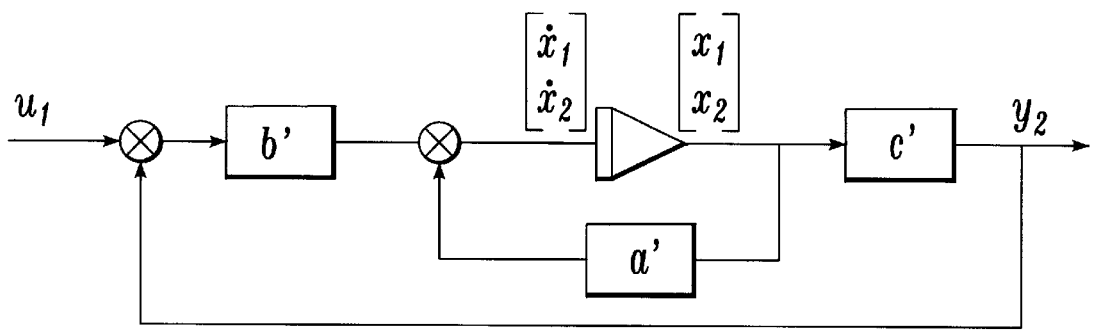

Since $n_{11}$, $d_{21}$, $d_{31}$, & $d_{41}$ are always equal to zero, then $d'=d_2 d_1=0$. Closing the loop by connecting the ydcmd ($y_2$) to the $\Lambda r$, ($u_1$), the block diagram representation of the closed loop system is shown in FIG. 8.

Figure 9:
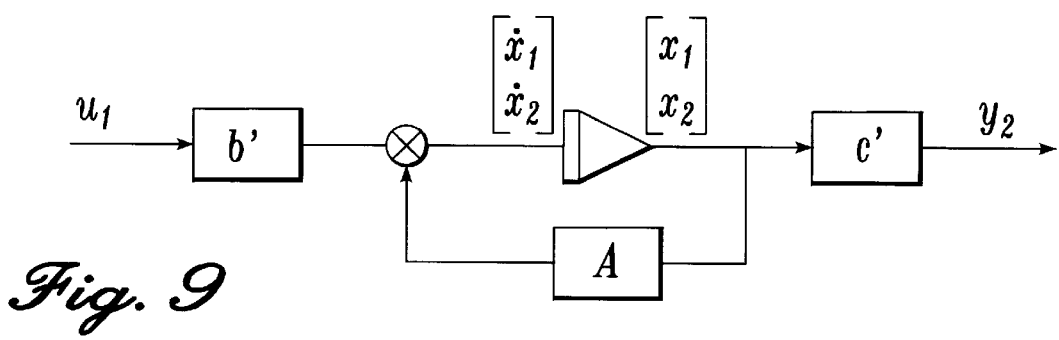

This closed loop system can be simplified as shown in FIG. 9, $$\text{where } A = a' + b'c'; b' = \begin{bmatrix} b_{11} \\ b_{12} \\ b_{13} \\ b_{14} \\ b_{15} \end{bmatrix} \text{ where } b_{15} = b_2 d_1$$

The state equations of the closed loop system can be expanded as follows:

$$\dot{\beta} = A_{11}\beta + A_{12}R + A_{13}\Phi + A_{14}P + A_{15}X + b_{11}\delta r$$
$$\dot{R} = A_{21}\beta + A_{22}R + A_{23}\Phi + A_{24}P + A_{25}X + b_{12}\delta r$$
$$\dot{\Phi} = A_{31}\beta + A_{32}R + A_{33}\Phi + A_{34}P + A_{35}X + b_{13}\delta r \quad \text{Eq.(1)}$$
$$\dot{P} = A_{41}\beta + A_{42}R + A_{43}\Phi + A_{44}P + A_{45}X + b_{14}\delta r$$
$$\dot{X} = A_{51}\beta + A_{52}R + A_{53}\Phi + A_{54}P + A_{55}X + b_{15}\delta r$$

where $$A = a'_{ij} + b'_{i1} c'_{1j}$$

For a steady state turn $$\Phi = \text{constant} \rightarrow \dot{P} = 0 \, \& \, \ddot{P} = 0;$$
$$R = \text{constant} \rightarrow \dot{R} = 0 \, \& \, \dot{X} = 0;$$
$$\beta = \text{constant} \rightarrow = \dot{\beta} = 0;$$

Thus, Eq. (1) becomes $$\dot{\beta} = A_{11}\beta + A_{12}R + A_{13}\Phi + A_{14}P + A_{15}X + b_{11}\delta r = 0$$
$$\dot{R} = A_{21}\beta + A_{22}R + A_{23}\Phi + A_{24}P + A_{25}X + b_{12}\delta r = 0$$
$$\dot{\Phi} = A_{31}\beta + A_{32}R + A_{33}\Phi + A_{34}P + A_{35}X + b_{13}\delta r = 0 \quad \text{Eq.(2)}$$
$$\dot{P} = A_{41}\beta + A_{42}R + A_{43}\Phi + A_{44}P + A_{45}X + b_{14}\delta r = 0$$
$$\dot{X} = A_{51}\beta + A_{52}R + A_{53}\Phi + A_{54}P + A_{55}X + b_{15}\delta \Gamma = 0$$

Eq. (2) can then be solved for $\Lambda r$ at a constant value of roll angle. $\Lambda r$ is the amount of rudder needed through roll angle feedback to keep the airplane from being divergent or convergent. Once the value of $\Lambda r$ has been calculated, the ideal turn coordination gain value can be calculated simply as the $\Lambda r$ divided by a constant for that aircraft.

The values for the matrices $a_1$, $b_1$, $c_1$ and $d_1$ will vary depending upon the operational flight conditions of the aircraft, including flap position. For example, aircraft variations in speed, weight, altitude, flap position and center of gravity will have an influence on the matrices. In the preferred embodiment, matrices are used that include extreme values of these operational parameters. The resulting turn coordination gain used in the look up table is then calculated as the mean of the turn coordination gains calculated using the various extreme matrices. This ensures that the turn coordination gain box 229 has taken into account all possible flight conditions.

Figure 10:
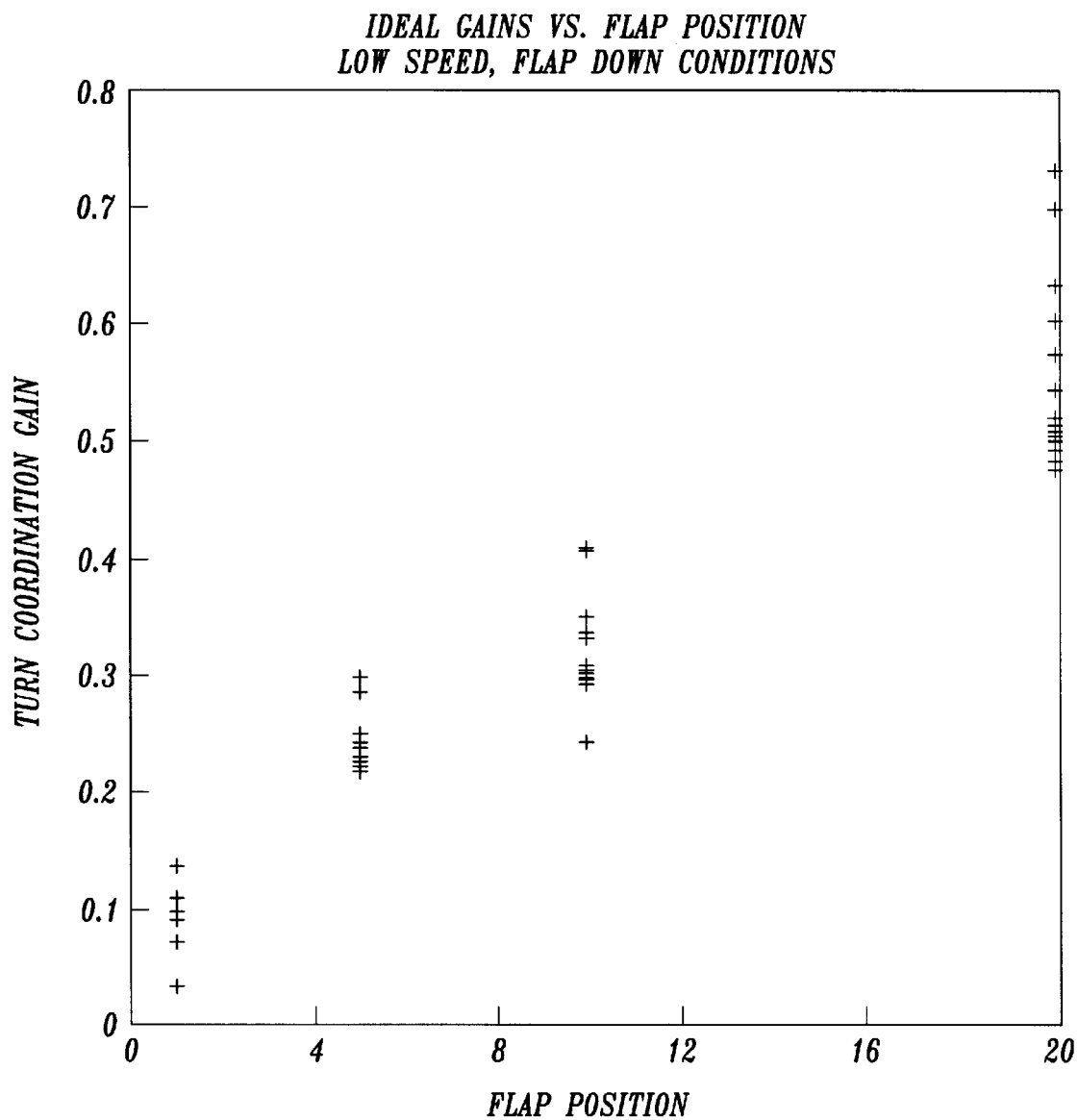
FIG. 10 is a graph of the turn coordination gain values calculated in accordance with the present invention.

For example, turning next to FIG. 10, actual turn coordination gain values were calculated for the Boeing 747-400 aircraft for various flap positions, namely, one, five, ten, and twenty degrees. Note that there are several turn coordination gain values for each flap position. This corresponds to the various extreme operating conditions of the aircraft. In the preferred embodiment, the turn coordination gain used in the look-up table will be the average of the extreme values.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of setting the turn coordination gain for the yaw damper of an aircraft during a turn, the method comprising the steps of:
    (a) referring to a turn coordination gain schedule, said turn coordination gain schedule correlating a plurality of turn coordination gains only with a plurality of flap position settings;
    (b) determining the flap position setting of said aircraft during said turn;
    (c) determining a preferred turn coordination gain as the turn coordination gain correlating to said flap position setting; and
    (d) setting the turn coordination gain for the yaw damper to said preferred turn coordination gain.

2. The method of claim 1 wherein said plurality of turn coordination gains are calculated by solving a set of state equations for the closed loop system of said aircraft at a steady state turn angle and at said plurality of flap position settings.

3. The method of claim 2 wherein said set of state equations is:

$$\dot{\beta} = A_{11}\beta + A_{12}R + A_{13}\Phi + A_{14}P + A_{15}X + b_{11}\delta r = 0$$
$$\dot{R} = A_{21}\beta + A_{22}R + A_{23}\Phi + A_{24}P + A_{25}X + b_{12}\delta r = 0$$
$$\dot{\Phi} = A_{31}\beta + A_{32}R + A_{33}\Phi + A_{34}P + A_{35}X + b_{13}\delta r = 0$$
$$\dot{P} = A_{41}\beta + A_{42}R + A_{43}\Phi + A_{44}P + A_{45}X + b_{14}\delta r = 0$$
$$\dot{X} = A_{51}\beta + A_{52}R + A_{53}\Phi + A_{54}P + A_{55}X + b_{15}\delta \Gamma = 0$$

where $A_{XY}$ and $b_{XY}$ are matrices determined from the aerodynamic properties of said aircraft.

4. The method of claim 1 wherein said flap position setting is received from a flap slat electronic unit aboard said aircraft.

5. The method of claim 2 wherein said flap position setting is received from a flap slat electronic unit aboard said aircraft.

6. An apparatus for determining the optimal turn coordination gain for an aircraft performing a turn, the apparatus comprising:
    (a) a turn coordination gain schedule, said turn coordination gain schedule correlating a plurality of turn coordination gains only with a plurality of flap position settings;

(b) a flap slat electronic unit for determining the flap position setting of said aircraft during said turn; and (c) means for determining said optimal turn coordination gain as the turn coordination gain correlating to said flap position setting.

7. In a yaw damper including a turn coordination gain box, the improvement comprising:

(a) a turn coordination gain schedule stored in said turn coordination gain box, said turn coordination gain schedule correlating a plurality of turn coordination gains only with a plurality of flap position settings;

(b) means for receiving from a flap slat electronic unit the flap position of setting of said aircraft during said turn; and (c) means for determining said optimal turn coordination gain as the turn coordination gain correlating to said flap position setting.

* * * * *